Feb. 22, 1966  C. KIMBLETON  3,237,076
SPEED CONTROL DEVICE FOR DIRECT CURRENT MOTOR
Filed March 5, 1962  2 Sheets-Sheet 1

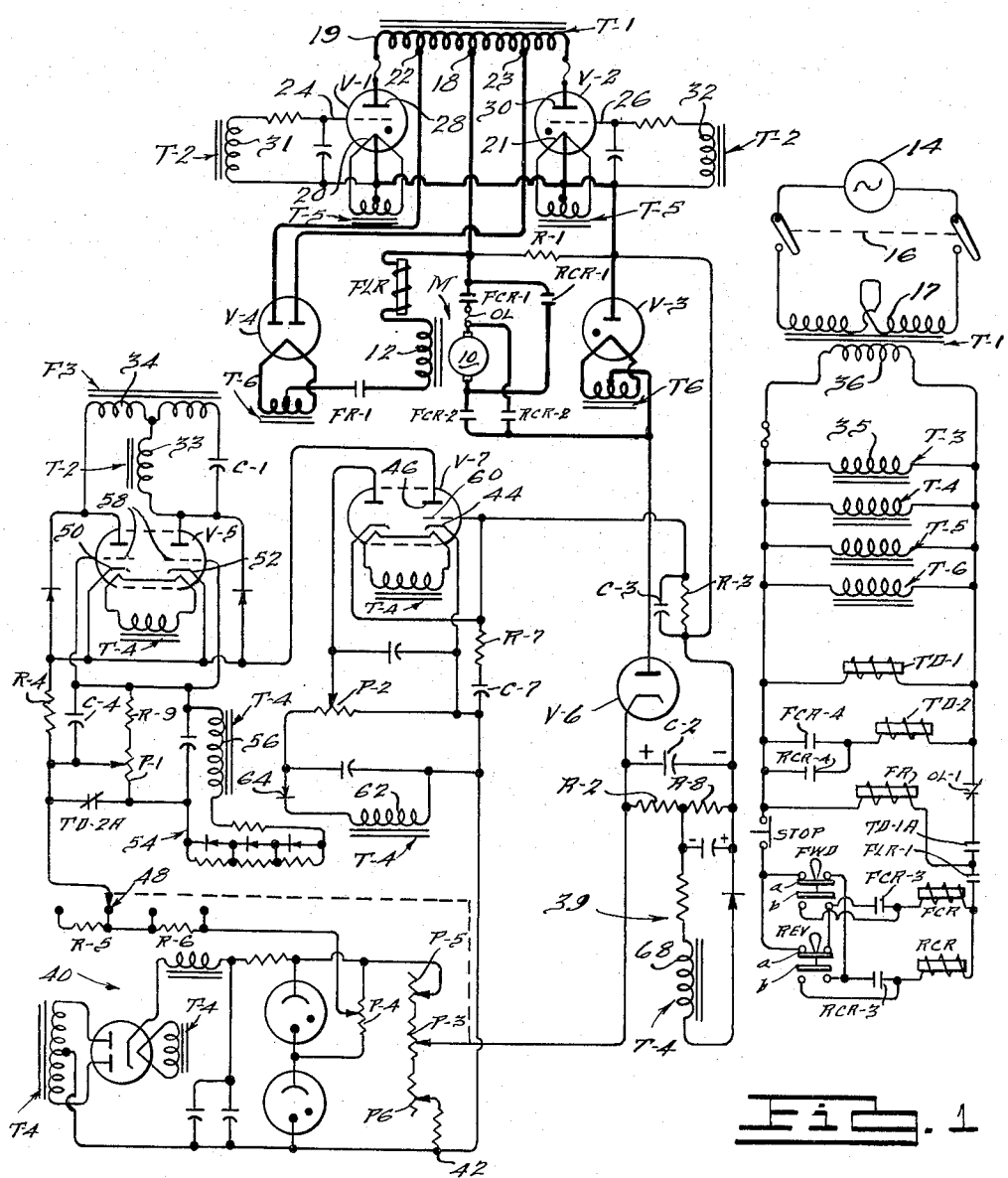

FCR - Forward Contactor has Contacts FCR-1, FCR-2, FCR-3, FCR-4.
RCR - Reverse Contactor has Contacts RCR-1, RCR-2, RCR-3, RCR-4.
TD-1 - Filament Time Delay has Contacts TD-1A.
TD-2 - Reversing Time Delay has Contacts TD-2A.
FR - Field Relay has Contacts FR-1.
FLR - Field Loss Relay has Contacts FLR-1.
OL - Overload Relay has Contacts OL-1.
FWD - Forward Pushbutton has Contacts a, b.
REV - Reverse Pushbutton has Contacts a, b.

Fig. 1

INVENTOR.
Cecil Kimbleton,
BY
John L. Stoughton.
HIS ATTORNEY

INVENTOR.
Cecil Kimbleton.

United States Patent Office 3,237,076
Patented Feb. 22, 1966

3,237,076
SPEED CONTROL DEVICE FOR DIRECT CURRENT MOTOR
Cecil Kimbleton, Utica, Mich., assignor to Weltronic Company, Southfield, Mich., a corporation of Michigan
Filed Mar. 5, 1962, Ser. No. 179,274
25 Claims. (Cl. 318—331)

This application is a continuation-in-part of and claims the benefit of the filing date of the parent application Serial No. 720,144, filed March 10, 1958 (now abandoned in favor of this application), as to the subject matter of FIG. 1 hereof, the description thereof and the claims herein supported thereby.

This invention relates to an improved speed control and indicating device for direct current motors, and more particularly, but not necessarily exclusively, to an improved device of this character which controls the flow of energizing current to the motor responsively to changes in the back E.M.F. of the motor.

One important object of the present invention is to provide an improved circuit for controlling the speed of a direct current electric motor.

Another object is to provide an improved device of this character including means for sensing the back E.M.F. of a direct current motor during operation thereof substantially independently of the input voltage.

Another object is to provide an improved circuit for controlling the speed of a direct current motor including circuit means for varying the input power to the motor responsively to changes in the back E.M.F. thereof.

Another object is to provide an improved speed control circuit for a direct current motor including means for varying the input power to the motor responsively to changes in load.

Another object is to provide an improved circuit for controlling the speed of a direct current motor energized from an alternating current source including a phase shift circuit for controlling the flow of current to the motor armature, and circuit means responsive to the back E.M.F. of the motor for automatically varying the phase shift circuit characteristics in such a way as to maintain the motor speed substantially constant at any selected value within a relatively wide range despite load and line voltage variations.

Still another object is to provide an improved circuit of this type including a negative feedback arrangement for varying the phase shift circuit characteristics responsively to changes in motor loading.

Still another object of this invention is to provide an improved circuit for controlling the speed of a direct current electrical motor which is energized during controllably variable portions of half-cycles of an alternating current source of energy in which the armature voltage or back E.M.F. of the motor is sensed while the motor is deenergized but during at least a portion of at least some of those same half-cycles.

Still another object of the invention is to provide an improved circuit for controlling the speed of a direct circuit current motor which is energized during a controllably variable portion of each cycle of alternating current from an alternating current source in which the armature voltage is sensed at all times other than during those periods of energization.

These and other objects and advantages of the invention will become apparent from the following detailed description of embodiments thereof taken together with the drawings in which:

FIG. 1 is a schematic diagram of a motor controller circuit according to the invention;

Figure 2:
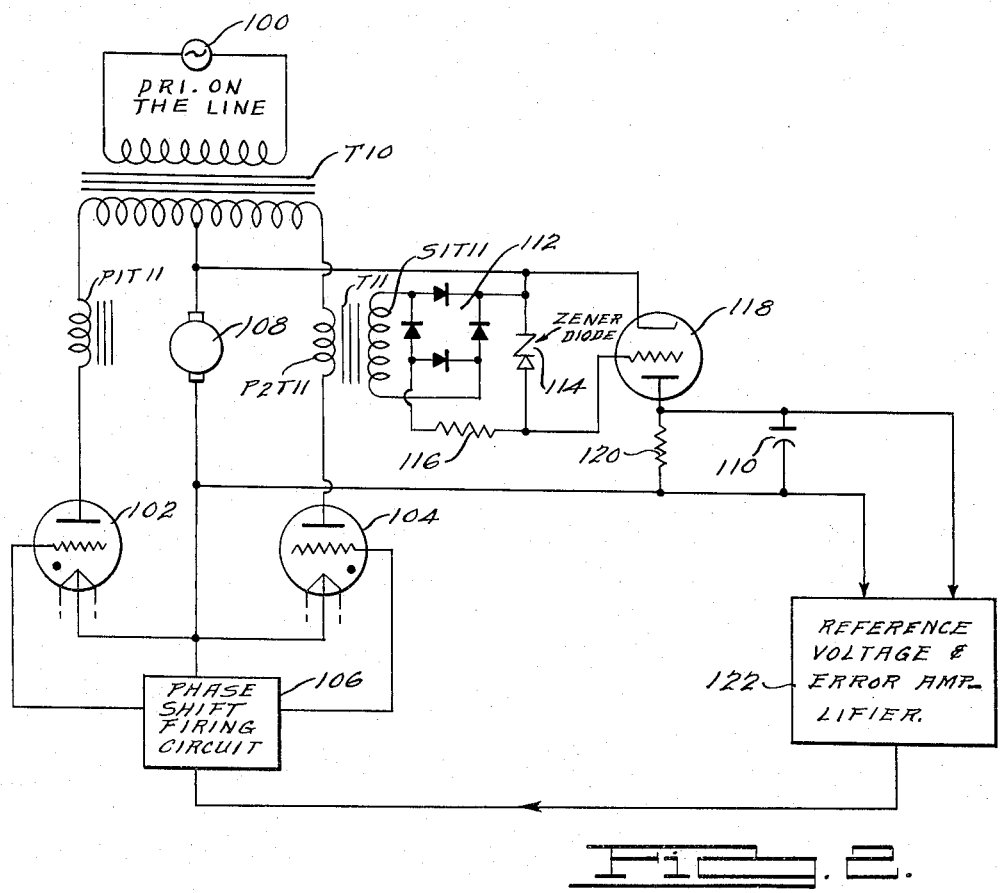
FIG. 2 is a schematic diagram of a variant of the motor control circuit of FIG. 1 also adapted to the practice of certain of the principles of the invention.

The circuit of FIG. 1 is arranged for controllably energizing a direct current motor M which, as shown, includes an armature 10 and a shunt wound field 12. Power for energizing the motor in the illustrated embodiment is taken from a single phase alternating current source 14 which is connected through a line disconnect switch 16 to the primary winding 17 of a main power transformer T–1. The armature 10 is connected to a first secondary winding 19 of the power transformer through a pair of controllable current rectifying devices such as the electron discharge gas tubes V–1 and V–2, which may be, for example, thyratrons of the type commercially designated C3J, connected for full wave rectification and having an output in series with another unidirectional current device of adequate current carrying capacity such as the electron discharge gas tube V–3 illustrated, which may be a thyratron tube of the type commercially designated NL619.

The energizing circuit for the armature 10 leads from the cathodes 20 and 21 of the tubes V–1 and V–2 through the tube V–3, through the armature 10, and then to the center tap 18 of the winding 19 of the power transformer. The contacts FCR–1, FCR–2, RCR–1 and RCR–2 of the forward and reverse contactors FCR and RCR, respectively, are connected in this circuit for selectively energizing the armature 10 for either forward or reverse drive. The contactors FCR and RCR are connected in reciprocally disabling, self-holding push button circuits as illustrated, in which the contacts FCR–3 and RCR–3 act as self-holding contacts.

The field 12 is connected to intermediate taps 22 and 23 of the secondary winding 19 through a full wave rectifier including the twin diode electron discharge gas tube V–4 which may be, for example, of the type commercially designated EL1C, in series with the field relay contacts FR–1. A field loss relay FLR is also connected in series with the field 12, and its normally open contacts FLR–1 are arranged to open and thereby to de-energize the armature control relays FCR and RCR in the event of accidental loss of field current.

The speed of the motor M is controlled by varying the phase of the alternating voltage bias imposed on the grids 24 and 26 of the thyratron tubes V–1 and V–2, and thus varying the time of firing of the tubes with respect to the alternating voltage impressed on their plates 28 and 30. The thyratron grids 24 and 26 are energized by secondary windings 31 and 32 of a control transformer T–2, the primary winding 33 of which is connected in an Alexanderson phase shift circuit. This circuit includes a center-tapped transformer winding 34 of a first auxiliary transformer T–3, the primary winding 35 of which is connected across a secondary winding 36 of the power transformer T–1. The primary winding 33 of the control transformer is connected in a resistance capacitative bridge circuit, the four arms of which are: the two parts of the secondary winding 34, a capacitor C–1, and a variable resistance circuit constituted by a twin triode vacuum tube V–5 and its associated circuit. The primary winding 33 of the control transformer is the bridge member, and it will be seen that variations in the resistance of the vacuum tube V–5 will affect the phase of the voltage impressed upon the primary winding 33 of the control transformer relative to the input voltage, that is, relative to the voltages across the windings of the power transformer T–1. Changes in the phase of the voltage across the control transformer windings 31, 32 and 33 affect the time of firing of the thyratrons V–1 and V–2 on each half-wave of the input voltage, and thus affect the duration of the input current pulses to the motor armature 10.

According to the present invention, the grid-to-cathode bias on the tube V–5 is varied responsively to changes in the back E.M.F. of the armature 10 in a direction to compensate for such changes and to maintain the back E.M.F. substantially constant. Changes in the back E.M.F. are amplified so that a relatively minute change in the back E.M.F. produces a substantial change in the output of the phase shift circuit. The arrangement is capable of maintaining the speed of the motor M constant within about ½ percent of its rated speed at any selected speed within a range of about 50:1, from full rated speed down to about 1/50 of full rated speed, despite normal line voltage variations and load variations from full load to no load.

According to the present invention, the back E.M.F. of the armature 10 is used for charging a capacitor C–2 during that part of each half cycle of the input voltage in which the thyratron tubes V–1 and V–2 are not conducting, that is, during the intervals between power pulses. The capacitor C–2 is connected in parallel with the gas tube V–3 through a rectifier device such as the diode vacuum tube V–6, which isolates the capacitor C–2 from the voltage drop across the gas tube V–3 during the armature input power pulses. An isolating, or charging resistor R–1 is connected between the plate of the gas tube V–3 and the negative terminal of the armature 10 to provide a conductive path for charging the capacitor C–2 during the intervals between the input pulses.

The connection is such that the armature voltage charges the capacitor C–2 only during the intervals between power pulses, that is, only during intervals when the gas tubes V–1, V–2, and V–3 are non-conductive and when the back E.M.F. appears across the armature terminals. During the input pulses, that is, during the times that the thyratrons V–1 and V–2 conduct, the capacitor C–2 is effectively isolated from that portion of the circuit in which the input pulses appear. During the intervals when the gas tubes V–1 and V–2 are not conducting, the back E.M.F. of the armature 10, which is of opposite polarity to the input voltage, causes a flow of current through the charging resistor R–1, and through the diode V–6 to charge the capacitor C–2.

The capacitor C–2 is connected in parallel with and discharges through a resistor R–2, the value of which is selected with regard to the capacity of the capacitor C–2 to provide a desired decay characteristic as hereinafter described. In the illustrated embodiment, for example, the capacitor C–2 may be of about .25 microfarad, the charging resistor R–1 of about 4000 ohms, the resistor R–2 of about 75 kilohms.

The capacitor C–2 is connected in the grid circuit of a triode amplifier tube V–7, which may be of the type commerically designated 6AQ7, and the plate circuit of which is arranged to control the bias (and thereby the resistance) of the phase shift tube V–5. Briefly, in operation, a relatively small change in motor speed such as the slowing occasioned by the initial application of a load results first in a relatively small change in the back E.M.F., which change reduces the charge of the capacitor C–2 slightly. The slight change in charge of the capacitor C–2 is amplified in the tube V–7 to produce a relatively large change in the phase shift circuit in a direction to increase the amount of power fed to the armature 10 and thereby to bring the motor back up to its initial speed.

Additional compensation is provided according to a further feature of the invention, by proper selection of the values of the charging resistor R–1 and the discharging resistor R–2 relative to the value of the capacitor C–2, so that the feedback is responsive not only to variations in the motor back E.M.F., but also to load variations. According to this feature, the charging time constant, that is, the time constant of R–1 and C–2, is selected to be equal to a significant portion of the duration of one-half cycle of the input voltage, and the discharging time constant is made sufficiently short to permit a significant discharge of the capacitor C–2 during the power input pulses, so that the average charge of the capacitor C–2 varies according to the charging intervals, or, in other words, inversely to the duration of the power pulses during which the gas tubes V–1 and V–2 are conducting.

This produces a secondary effect. When the motor M is lightly loaded, the power pulses are relatively short and the charging intervals are relatively long, so that charging current flows for relatively long intervals through the charging resistor R–1, charging the capacitor C–2 relatively closely to the full value of the back E.M.F. Moreover, the capacitor C–2 can discharge through the resistor R–2 only during the relatively short power pulses, so its average charge during low load operation is relatively high. When, now, the motor load is increased, the hereinabove described circuit action causes an increase in the duration of the power pulses and a decrease in the charging intervals. Neglecting the slight decrease in the back E.M.F. caused by the slight initial slowing of the motor, the reduced charging time for charging the capacitor C–2, and the increased duration of the power pulses during which the capacitor C–2 discharges tend to reduce the average charge of the capacitor C–2, and thus to produce a new feedback signal which is amplified in the tube V–7 and causes a further increase in the flow of power to the motor M. Thus, the circuit is not only responsive to changes in the motor back E.M.F., but also to changes in load.

The magnitude of this secondary, load responsive effect may be varied by changing the charging and discharging time constants of the capacitor C–2, and may be made large enough to cause the circuit to "over control" the motor, increasing the motor speed responsively to an increase in load. The effect is increased by an increase in the charging time constant, as by increasing the value of R–1, and by a decrease in the discharging time constant, as by decreasing the value of R–2. Conversely, the effect may be minimized by selecting a very large value, such as, for example, several megohms, for the discharge resistor R–2, making the discharge time constant of the capacitor C–2 very long relative to the duration of the intervals between power pulses. In this latter case, since the capacitor C–2 will always be charged to substantially the full value of the motor back E.M.F., a voltmeter (not shown) may be connected directly across the capacitor C–2 for providing a direct indication of motor speed, and thus the circuit may be used as a relatively accurate tachometer.

It has been found empirically that in operation an unexpected voltage appears in the circuit tending to charge the capictor C–2 in the same direction as the motor back E.M.F. This unexpected voltage, the source of which is at present not fully understood, is of relatively small magnitude and appears to be significant only at relatively low motor speeds, particularly at speeds below about 1/20 of the full rated speed of the motor M.

An auxiliary power supply 39, energized by a secondary winding 68 of the transformer T–4, is series connected in the discharge circuit of the capacitor C–2 to counteract this unexpected voltage, and to provide improved speed control at motor speeds down to about 1/50 of rated speed. The parameters of the auxiliary power supply are selected to provide a D.C. voltage output, as measured across the resistor R–8, of opposite polarity and approximately equal to the voltage appearing across the capacitor C–2 in the absence of the auxiliary power supply when the motor is stalled. In an actual embodiment, in which the illustrated circuit was connected to drive a D.C. motor rated at 230 volts input voltage, satisfactory speed control at low speeds was achieved when the voltage output of the auxiliary power supply 39 was in the range of about 6 to 16 volts.

Power for the amplifier tube V–7 is provided by a regulated power supply 40, which is energized through a transformer T–4 connected to the secondary winding 36 of the power transformer T–1. The negative output terminal 42 of the power supply 40 is connected directly to the cathode 44 of the triode section of the tube V–7. The plate 46 of the tube V–7 is connected to a positive output potentiometer P–4 in the power supply through a load resistor R–4 and a switch 48, which is arranged selectively to connect one or both of two compensating resistors R–5 and R–6 in the circuit.

The cathodes 50 and 52 of the phase shift tube V–5 are connected directly to the plate 46 of the amplifier V–7. Grid bias for the phase shift tube V–5 is provided by a rectifier 54, which is powered by a secondary winding 56 of the transformer T–4, and which is connected between the grids 58 and the positive end of the plate load resistor R–4. Variations in the plate current of the amplifier V–7 causes corresponding changes in the voltage drop across the plate load resistor R–4, and thus cause changes in the grid-to-cathode bias of the phase shift tube V–5.

The grid 60 of the amplifier V–7 is connected through a capacitor C–3 and a resistor R–3 to the negative plate of the capacitor C–2, the positive plate of which is connected to the contact arm of a speed selection potentiometer P–3 in the output of the regulated power supply. The grid-to-cathode voltage in the amplifier V–7 is the algebraic sum of the voltage across the capacitor C–2, and the voltage between the arm of the potentiometer P–3 and the negative terminal 42 of the power supply. Variations in either one of these voltages affect the plate current in the amplifier tube V–7, and through the phase shift tube V–5, change the flow of power to the motor armature 10. A pair of potentiometers P–5 and P–6 are connected in series with the speed control potentiometer P–3 for adjusting the limits of the speed control range for the motor M. The diode section of the tube V–7 is connected and biased to limit the negative swings of the grid 60 with respect to the cathode 44, and thus to enable the circuit to recover control relatively rapidly after the control potentiometer has been adjusted for a rapid motor speed reduction, or after the motor load has been suddenly removed. Such actions produce relatively strong negative signals on the amplifier grid 60, which may drive the grid beyond cut-off, and in the absence of the diode limiter may charge the error integrating capacitor C–7 sufficiently to keep the amplifier biased beyond cut-off for an undesirably long period of time, as determined by the relatively long discharge time constant of the capacitor C–7. A separate winding 62 of the transformer T–4 is connected in the diode circuit of the tube V–7 in series with a rectifier device 64 and a potentiometer P–2 for providing an adjustable bias for this purpose.

The filaments of the various discharge tubes in the circuit may be heated as illustrated by appropriate windings of the transformers T–4, T–5 and T–6 as indicated in the drawing.

In operation, the line switch 16 is first closed, energizing the power transformer T–1, the auxiliary transformers T–3 through T–6, and a filament delay relay TD–1, the time delay of which is sufficient to permit all of the tube filaments to reach operating temperature before the relay contacts TD–1A close. Closing of the filament delay relay contacts TD–1A energizes the field relay FR, closing the contacts FR–1 and thereby energizing the field 12 and the field loss relay FLR. Closing of the field loss relay contacts FLR–1 responsively to energization of the relay FLR enables the forward and reverse push button circuits, permitting energization of the armature 10.

One or the other of the operating push buttons FWD or REV is then manually actuated to start the motor M. Momentary actuation of the forward push button FWD, for example, momentarily disables the reverse push button circuit and energizes the forward contactor FCR, which then closes its contacts FCR–1, FCR–2, FCR–3, and FCR–4. The contacts FCR–1 and FCR–2 connect the armature 10 in the power circuit. The third contact FCR–3 is a holding contact to keep the contactor FCR energized until the circuit is otherwise broken, as by actuation of the reverse push button REV or the STOP push button, opening of the line switch 16, opening of the field loss relay contacts FLR–1, or opening of the overload contacts OL–1. Closing of the fourth contacts FCR–4 energizes a reversing time delay relay TD–2, normally closed contacts TD–2A of which are in the grid bias circuit of the phase shift tube V–5. As long as these contacts TD–2A remain closed, the grids 58 of the phase shift tube are biased to the maximum negative value with regard to the cathodes 50 and 52, thus restricting the flow of power to the armature 10 to a ratio less than that required for operation at the pre-selected speed. The delay is selected to allow time for the motor to accelerate without current overloading.

After the contacts TD–2A open, the grid bias of the phase shift tube V–5 is gradually reduced to the value determined by the setting of the potentiometer P–1 as the capacitor C–4 discharges through the potentiometer P–1 and the resistor R–9 in series with it. The time constant of this circuit including the capacitor C–4, the potentiometer P–1, and the resistor R–9 is selected with regard to the motor characteristics to provide for smooth acceleration.

The motor speed is then controlled by the circuit arrangement as hereinabove described, responsively in the first instance to changes in the motor back E.M.F., and in the second instance to changes in the duration of the power input pulses. The potentiometer P–3 is adjusted manually to vary the motor speed as desired within the limits set by the limiting potentiometers P–5 and P–6. Assuming, for example, that the motor M has been accelerated to a desired speed under "no load" conditions, the capacitor C–2 will be charged to approximately the full value of the back E.M.F. of the motor M, and the phase shift tube V–5 will be biased to a high resistance condition. The phase shift of the voltage of the transformer T–2 will be relatively large, and the firing periods of the thyratrons V–1 and V–2 will be relatively short. The charging intervals for the capacitor C–2 will be relatively long.

In response to any effect that tends to increase the motor speed, the back E.M.F., which varies according to motor speed, increases, causing an increase of charge of the capacitor C–2, driving the grid 60 of the amplifier more negative with respect to the cathode 44. This increases the potential of the cathodes 50 and 52 of the phase shift tube V–5 relative to the grids 58, and thereby reduces the power pulse duration until the initial motor speed is attained again.

In response to any effect such as the imposition of a load, tending to reduce the motor speed, the opposite effect takes place. The back E.M.F. is at first slightly reduced due to the initial slowing down of the motor. This reduces the charge on the capacitor C–2, raising the potential of the amplifier grid 60, causing an increase in amplifier plate current with a consequent increase in the voltage drop across the plate load resistor R–4 and a decease in the resistance value of the phase shift tube V–5. This action increases the duration of the power pulses, that is, the proportion of the input voltage cycle during which the thyratrons V–1 and V–2 conduct, and decreases the intervals between power pulses.

The secondary, load responsive characteristic of the circuit now immediately comes into play. Due to the lengthening of the power pulses and the shortening of the intervals, the average potential across the capacitor C–2 is reduced further, that is, the reduction of the average charge across the capacitor C–2 is greater than the reduction of the back E.M.F. of the motor. This causes a further response in the amplifier V-7 and the phase shift tube V-5, and a further increase of the power input to the motor M.

When it is desired to change the motor speed, the potentiometer P-3 is manually adjusted, changing the grid-to-cathode bias of the amplifier tube V-7 and setting up a new equilibrium condition in the circuit. The switch 48 is ganged with the potentiometer P-3 and switches the resistors R-5 and R-6 in and out of the amplifier plate supply circuit according to the motor operating speed to compensate for the non-linear characteristics of the vacuum tubes V-7 and V-5.

The signal produced across the capacitor C-2 is differentiated by the capacitor C-3 in series with the resistor R-7 in the grid circuit of the amplifier V-7 to provide anti-hunting characteristics. The capacitor C-3 in the embodiment shown may have a value of about .001 microfarad, and the resistor R-7 may be of about 150 kilohms. The error integrating capacitor C-7 may be about 0.5 microfarad.

In general, in the circuit illustrated in FIG. 1 of the drawings, it will be seen that the armature 10 is energized during controllably variable portions of the half-cycles of the source current, and that capacitor C-2 is connected to sense the voltage across that armature during at least a portion of at least some of those same half-cycles and, in the illustrated arrangement, during the time that armature 10 is not energized from the source of alternating current.

Another arrangement having the same general capabilities is illustrated in FIG. 2 of the drawings. Since FIG. 2 represents but a variant of the arrangement illustrated in FIG. 1, portions of the circuit are represented in block schematic form and the description of the circuit of FIG. 2 will, except for certain generalizations, be restricted primarily to those characteristics in which it differs from the circuit of FIG. 1.

In the arrangement of FIG. 2, alternating current from a source 100 is applied across the primary winding of transformer T10 to induce an alternating voltage across the center-tapped secondary winding of that transformer. In a manner similar to that previously described in connection with FIG. 1, a pair of controlled rectifier devices 102 and 104 is connected in series between the motor and the source of alternating current; specifically, rectifier devices 102 and 104 are connected to the two halves of the secondary winding of transformer T10. In the illustrative arrangement, devices 102 and 104 are thyratrons. The firing angles of those rectifier devices 102 and 104 are controlled by a phase-shifted firing circuit illustrated at 106 which may be of the nature of that illustrated in FIG. 1 or any type capable of supplying that which is or appears as a phase shifted voltage between the control grids and the cathodes of those tubes, and hence of supplying firing voltages to those tubes in selected time relationships to the plate voltages apply thereto. During that portion of the half-cycles of the source current during which device 102 is conductive, current flows from the left-hand end of the transformer winding T10, through one primary winding P1T11 of a transformer T11, through device 102, and back to the center tap of the secondary winding of transformer T10 through the armature 108 of the motor the speed of which is to be controlled. The voltage developed across the armature as a result of this current is such that the lower terminal of the armature 108 is positive relative to the upper terminal. During that portion of the other half-cycles during which control device 104 is conductive, conventional current flows from the right-hand end of the secondary winding of transformer T10 through another primary winding P2T11 of the aforesaid transformer T11, through device 104, and back to the center tap of the secondary winding of transformer T10 through armature 108, the current again devolping a voltage across armature 108 of the same polarity.

In the arrangement of FIG. 1, sensing means, in the form of a capacitor, is provided to sense the armature voltage during the periods in which the controlled rectifier devices are non-conductive, which requires means for detecting when those control rectifier devices are non-conductive. The arrangement of FIG. 2 also includes a capacitor 110 for sensing the back E.M.F. of the armature during the periods in which it is not energized from the source of alternating current and in the arrangement of FIG. 2 a different means is illustrated for detecting when the control rectifier devices 102 and 104 are non-conductive. That means includes transformer T11. When current is flowing through either winding P1T11 or winding P2T11 of transformer T11, a current is induced in secondary winding S1T11 of that transformer. The relationship between the magnitude of the current in the primary windings and the magnitude of the current in the secondary winding is not critical nor is it critical whether the current in the secondary winding S1T11 is in phase with the current in primary winding P2T11 or in phase with the current in primary winding P1T11 but in the illustrated arrangement, in which both energization and sensing occur on a full-wave (rather than on a half-wave) basis, the polarity of the voltage developed across secondary winding S1T11 when primary winding P1T11 is energized should be inverted from the polarity of the voltage induced across winding S1T11 in response to the energization of primary winding P2T11, that is, windings P1T11 and P2T11 should be out of phase with one another with respect to secondary winding S1T11.

The alternating voltage developed across secondary winding S1T11 would be essentially a full sinusoidal wave of the same frequency as the source 100 if the controlled rectifier devices 102, 104 each fired during 100 percent of their respective half-cycles of the source current. With anything less than that 100 percent operation, the voltage appearing across secondary winding S1T11 will appear as a series of pulses of alternating polarities but recurring at the same frequency as the source current. The duration of each such pulse will, of course, be determined primarily by the duration of the conductivity of the controlled rectifier devices during each half-cycle of the alternating current and consequently this signal accurately indicates whether each of the control rectifier devices 102, 104 is conductive or non-conductive at any instant of time.

The alternating voltage appearing across winding S1T11 is rectified by a full wave rectifying bridge 112 to develop a pulsating direct voltage across the series combination of a zener diode 114 and a resistor 116, alternate ones of these pulses concurring with the conductive periods of controlled rectifier device 102 and the remaining ones of those pulses concurring with the conductive periods of controlled rectifier device 104.

The pulsating direct voltage appearing across zener diode 114 is applied between the cathode and the control grid of a vacuum tube amplifier 118, with the connections being such that each pulse drives the cathode of tube 118 positive with respect to its control grid.

The cathode of tube 118 is further connected to the center tap of the secondary winding of transformer T11 and hence is connected to the upper terminal of armature 108, while the anode of that triode is connected through a load resistor 120 to the lower terminal of armature 108, so that the series combination of tube 118 and resistor 120 is connected across that armature. The voltage across the armature serves as a source of plate voltage for tube 118 and is of the correct polarity both when armature 108 is being energized from the source, during the conductive periods of controlled rectifiers 102 and 104 and during the periods in which armature 108 is developing a properly sensible back E.M.F., during the periods in which control rectifiers 102 and 104 are non-conductive. However, when either rectifier 102 or rectifier 104 is conducting, a direct voltage pulse appears across zener diode 114, as described, and is applied between the cathode and grid of triode 118 to prevent conduction of that triode, and accordingly the plate current flowing through resistor 120 during any time that control rectifier 102 or control rectifier 104 is conducting is very low and effectively zero. Conversely, if neither rectifier 102 nor rectifier 104 is conducting, the negative biasing potential is not applied between the control grid and cathode of triode 118 and that tube is permitted to fully conduct, with plate current flowing from the lower terminal of armature 108 (now operating as a direct voltage source) through resistor 120, through tube 118, and back to the upper terminal of armature 108.

The resultant voltage developed across resistor 120 is applied across sensing capacitor 110, which is connected in shunt thereof, so as to charge capacitor 110 with its lower electrode positive and its upper electrode negative. Capacitor 110 is charged in accordance with the magnitude of the voltage across resistor 120 and hence in accordance with the magnitude of the voltage appearing across armature 108. In a manner identical or similar to that illustrated and described in connection with FIG. 1, the voltage appearing across the sensing capacitor is applied through a reference voltage and error amplifier 122 to control the phase shift firing circuit 106 so as to control the firing angles of the controlled rectifier devices 102 and 104.

As soon as either controlled rectifier 102 or 104 becomes conductive, a negative-biasing voltage pulse is applied between the control grid and cathode of triode 118 to terminate the flow of plate current through load resistor 120. As a result, capacitor 110 is permitted to commence to discharge through resistor 120 and will continue to discharge until that control rectifier 102 or 104 again becomes non-conductive. As a result, the average charge of sensing capacitor 110 varies not only in accordance with the magnitude of the back E.M.F. of armature 108 as sensed during the periods in which that armature is not being energized from the source, but also in accordance with the durations of the periods of non-conductivity of those controlled rectifier devices, for a purpose hereinbefore described.

Figure 3:
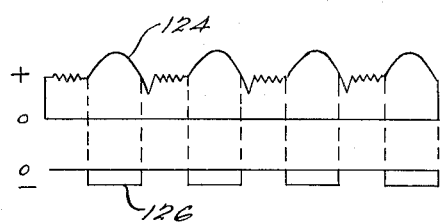
FIG. 3 is a curve showing certain of the voltage time relationships in the circuit of FIG. 2.

Curve 124 in FIG. 3 of the drawings represents the voltage between the anode and the cathode of triode 118 under the conditions which exist when the firing angles of the controlled rectifier devices 102 and 104 are at one selected value. The periodic major voltage increases reflect the periods of alternative conductivity of controlled rectifier devices 102 and 104, whereas the intervening voltages indicate a representative back E.M.F. across armature 108. Curve 126, in FIG. 3, represents the voltage between the control grid and cathode of triode 118, with the negative-going pulsations of that voltage driving the triode to or substantially to cutoff. As will be seen, the negative pulsations illustrated in curve 126 coincide with the points on curve 124 at which the controlled rectifier devices 102 and 104 are conductive. Hence, triode 118 can conduct only during the periods in which those controlled rectifiers are non-conductive so the capacitor 110 will effectively sense the voltage across armature 108 only during those periods in which those controlled rectifiers are not conductive. It will be observed that since in normal practice the controlled rectifiers would be firing less than 100 percent of each half-cycle, capacitor 110 will sense the voltage across the armature during a portion of every half-cycle, with a full-wave arrangement as representatively illustrated. With a half-wave arrangement (such as would be obtained if tube 102 were disabled), and with the armature 108 being energized from the source during a controllably variable portion of each alternate half-cycle, capacitor 110 would sense the armature voltage during the remainder of each of those half-cycles as well as during the other, alternate, half-cycles.

It will be observed that both the circuit of FIG. 1 and the circuit of FIG. 2 are capable of operating on a basis in which the duration of the energizing pulses to the armature is controllably modulated in accordance with the average duration of the periods between the energizing pulses and that they, in addition, operate on a basis in which that modulation is further controlled in accordance with the average amplitude of the armature voltage as sensed during the intervals between the energizing pulses. It will be apparent that many other circuits could be made to operate on a similar basis, and the man skilled in this art will recognize that with suitable instrumentation, these methods could be performed, less satisfactorily, by hand.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In an electrical circuit for controlling the flow of power from an alternating current source to a direct current motor including a controllable rectifying device connected in series between the motor and the source, and a variable phase shift circuit arranged for controlling the rectifying device to cause it to be conductive during a controllably variable portion of each cycle of the source thereby to deliver intermittent pulses of electrical energy to the motor, circuit means for varying the energy content of the pulses responsively to changes in motor speed and loading comprising a second rectifying device in series between the controllable rectifying device and the motor, a resistive circuit element connected across the output terminals of the controllable rectifying device whereby during the intervals btween the motor energizing pulses the back E.M.F. of the motor is applied in the back direction across said second rectifying device, a unidirectional current device, a capacitor connected in series with said unidirectional current device and the motor, said unidirectional current device being polarized to permit charging current to flow to said capacitor responsively to the motor back E.M.F. and to block current flow to said capacitor in response to the motor energizing pulses, a discharge resistor connected in parallel with said capacitor, an amplifier connected for varying said variable phase shift circuit and having a control grid, means connecting said capacitor to said control grid whereby said amplifier is responsive to charge variations in said capacitor and an adjustable voltage source in series with said capacitor and said control grid and operative to vary the grid bias of said amplifier and thereby to vary the motor speed.

2. The circuit as claimed in claim 1 and also including an auxiliary direct current source connected in series with said capacitor and said discharge resistor and polarized in a direction to oppose charging of said capacitor by the back E.M.F. of the motor.

3. In an electrical circuit for sensing the armature voltage of an electric motor which is energized by time-spaced energizing pulses of electric energy of variable duration and with variable intervals between those energizing pulses, the combination of voltage sensing means for developing a signal which varies in accordance with the magnitude and duration of the voltage applied thereto, and means for connecting said voltage sensing means between the armature terminals of the motor during the intervals between energizing pulses and for periods which vary with variations in the intervals between the energizing pulses, said connecting means including means for preventing electric current flow between said voltage sensing means and the motor during the energizing pulses.

4. In an electrical circuit for sensing the voltage of an electric motor which is energized by time-spaced energizing pulses of electric energy of variable duration, the combination of a voltage sensing device, and means for connecting said device across the motor, said connecting means including sensing means for sensing the application of an energizing pulse to the motor and means controlled by said sensing means for conducting current between the motor and said device during substantially the entirety of the variable-duration intervals between energizing pulses and for preventing current flow between the motor and said device during the energizing pulses.

5. In an electrical circuit for sensing the armature voltage of an electric motor which is energized by time-spaced energizing pulses of electric energy of variable duration and with variable intervals between those energizing pulses, the combination of a voltage sensing device, and means for connecting said device between the armature terminals of the motor during at least some of the intervals between energizing pulses and for periods which vary with variations in the intervals between the energizing pulses, said connecting means including sensing means for sensing the application of an energizing pulse to the armature and means controlled by said sensing means for preventing current flow between the motor and said device during the energizing pulses.

6. In an electrical circuit for sensing the armature voltage of an electric motor which is energized by time-spaced energizing pulses of electric energy, of variable duration and with variable intervals between those energizing pulses, the combination of a capacitor, a resistor connected in series with said capacitor, and means effective during substantially the entirety of at least some of the intervals between energizing pulses for charging said capacitor through and in series with said resistor from the motor and effective during said energizing pulses for preventing current flow between the motor and said capacitor.

7. An electrical circuit for sensing the armature voltage of an electric motor which is energized by time spaced pulses of electric energy, said circuit comprising a capcitor, and means connecting said capacitor between the armature terminals of the motor, said connecting means including a resistor, a first unidirectional current device connected in series with said resistor between the armature motor terminals, a second unidirectional current device, and means connecting said capacitor and said second unidirectional device in series with each other between the motor terminal to which said first unidirectional device is connected and the common terminal between said first unidirectional device and said resistor.

8. In an electrical circuit for sensing the armature voltage of an electric motor which is energized by time spaced energizing pulses of electric energy of variable duration and with variable intervals between those energizing pulses, the combination of a capacitor, means for connecting said capacitor between the armature terminals of the motor, said connecting means including unidirectional current means for conducting current between the motor and said capacitor during substantially the entirety of at least some of the intervals between energizing pulses and for blocking current flow between the motor and said capacitor during the energizing pulses, means for controlling the rate at which said capacitor is charged by the armature voltage for varying the capacitor charge in accordance with to the length of the intervals, and means for discharging said capacitor during and only during the energizing pulses at a controlled rate for modifying the capacitor charge in accordance with the relative lengths of the energizing pulses and the intervals between the energizing pulses.

9. In an electrical circuit for sensing the voltage of an electric motor having two terminals which is energized by time-spaced energizing pulses of electric energy of variable duration and with variable intervals between those energizing pulses, the combination of an E.M.F. sensing device, and means for connecting said device between the motor terminals, said connecting means including sensing means responsive to the energizing pulses and means controlled by said sensing means for isolating said sensing device from the effect of the motor voltage during the energizing pulses.

10. In a system including a direct current motor the rotational speed of which varies in accordance with the average energy applied thereto, and controlled rectifier means for periodically applying to the armature of the motor unidirectional pulses of current from a source of alternating voltage and for varying the duration of each of those pulses in accordance with the magnitude of a direct voltage signal, the armature tending to produce current flow through itself in a direction opposite to the direction of the pulses during the intervals between the pulses, the combination of voltage sensing means for developing a signal which varies in accordance with the magnitude and duration of the voltage applied thereto, circuit means for developing a direct voltage across said voltage sensing means during substantially the entirety of at least some of the intervals between pulses and for periods which vary with vibrations in the intervals between the energizing pulses and having a magnitude controlled by the magnitude of the armature E.M.F. during the intervals, said circuit means comprising a unidirectional current conducting device for connecting said voltage sensing means in series with the motor armature and poled to pass armature current in said opposite direction, and means responsive to said signal for applying a controlling direct voltage to the controlled rectifier means.

11. In a system including a direct current motor the rotational speed of which varies in accordance with the average energy applied thereto, and controlled rectifier means for periodically applying to the armature of the motor unidirectional pulses of current from a source of alternating voltage and for varying the duration of each of those pulses in accordance with the magnitude of a direct voltage signal, the armature tending to produce current flow through itself in a direction opposite to the direction of the pulses during the intervals between the pulses, the combination of voltage sensing means including a resistor and a capacitor connected in series for developing a signal which varies in accordance with the magnitude and duration of the voltage applied thereto, circuit means for developing a direct voltage across said voltage sensing means during substantially the entirety of at least some of the intervals between pulses and for periods which vary with variations in the intervals between the energizing pulses and having a magnitude controlled by the magnitude of the armature E.M.F. during the intervals, said circuit means comprising a unidirectional current conducting device for connecting said voltage sensing means in series with the motor armature and poled to pass armature current in said opposite direction, and means responsive to said signal for applying a controlling direct voltage to the controlled rectifier means.

12. An electrical circuit for sensing the armature voltage of an electric motor which is energized by time spaced pulses of electric energy applied to the armature, said circuit comprising a voltage sensing device, and means for connecting said device between the armature terminals of the motor, said connecting means including means responsive to the energizing pulses applied to the armature for preventing electric current flow between said device and the motor during the energizing pulses applied to the armature.

13. An electrical circuit for sensing the armature voltage of an electric motor having two terminals which is energized by time spaced pulses of electric energy of variable duration and with variable intervals between those energizing pulses, said circuit comprising a voltage sensing device and means for connecting said device between the terminals of the motor during substantially the entirety of at least some of the intervals between energizing pulses and for periods which vary with variations in the intervals between the energizing pulses and, said connecting means including means responsive to the energizing pulses applied to the terminals for preventing electric current flow between said device and the motor during the energizing pulses applied to the terminals.

14. In an electrical circuit for controlling the flow of power from an alternating current source to a direct current motor, the combination of a controllable rectifier device in series between the motor and the source, control means for controlling said device to cause it to be conductive during controllably variable portions of half cycles of the source current and to be nonconductive during the other portion thereof thereby to vary the power input to the motor, sensing means for sensing the armature voltage of the motor during at least a portion of said other portion of at least some of those same half cycles, means controlled by said sensing means and including said control means for varying the duration of the conductivity and nonconductivity of said device, and means controlled by said device and effective in response to nonconductivity thereof for enabling said sensing means to sense the armature voltage and effective in response to conductivity of said device for disabling said sensing means to sense said armature voltage during said variable portions of said half cycles.

15. In an electrical circuit for controlling the flow of power from an alternating current source to a direct current motor, the combination of a controllable rectifier device connected in series between the motor and the source, control means for controlling said device to cause it to be conductive during controllably variable portions of half cycles of both polarities of the source current and to be nonconductive during the other portion thereof thereby to vary the power input to the motor, sensing means for sensing the armature voltage of the motor during at least a portion of at least some of those same half cycles, means controlled by said sensing means and including said control means for varying the duration of the conductivity and nonconductivity of said device, and means controlled by said device and effective in response to nonconductivity thereof for enabling said sensing means to sense the armature voltage and effective in response to conductivity of said device for disabling said sensing means to sense said armature voltage during said variable portions of said half cycles of both polarities.

16. In an electrical circuit for controlling the flow of power from an alternating current source to a direct current motor, the combination of a controllable rectifier device connected in series between the motor and the source, control means for controlling said device to cause it to be conductive during controllably variable portions of half cycles of the source current and to be nonconductive during the other portion thereof thereby to vary the power input to the motor, sensing means including a capacitor for sensing the armature voltage of the motor during at least a portion of said other portion of at least some of those same half cycles when said rectifier device is nonconductive, means for disabling said sensing means to sense said armature voltage during said variable portions of said half cycles and while said rectifier device is conductive, means including said sensing means for developing a voltage signal which varies in magnitude in accordance with the amplitude of said armature voltage during the sensing periods, and means responsive to said voltage signal for controlling said control means.

17. In an electrical circuit for controlling the flow of power from an alternating current source to a direct current motor, the combination of a controllable rectifier device connected in series between the motor and the source, control means for controlling said device to cause it to be conductive during controllably variable portions of half cycles of the source current and to be nonconductive during the other portion thereof thereby to vary the power input to the motor, sensing means including a capacitor for sensing the armature voltage of the motor during at least a portion of said other portion of at least some of those same half cycles when said rectifier device is nonconductive, means for disabling said sensing means to sense said armature voltage during said variable portions of said half cycles and while said rectifier device is conductive, means including said sensing means for developing a voltage signal which varies in magnitude in accordance with the amplitude of said armature voltage during the sensing periods and in accordance with the duration of said controllably variable portions of half cycles of the source current, and means responsive to said voltage signal for controlling said control means.

18. The combination of claim 17 in which the magnitude of said voltage signal varies directly with the amplitude of said armature voltage during said sensing periods and varies inversely with the duration of said controllably variable portions of half cycles of the source current.

19. In an electrical circuit for controlling the flow of power from an alternating current source to a direct current motor, the combination of a controllable rectifier device connected in series between the motor and the source, control means for controlling said device to cause it to be conductive during controllably variable portions of half cycles of the source current thereby to vary the power input to the motor and to be nonconductive during the other portion thereof, a capacitor, circuit means for establishing a charge-changing circuit for said capacitor for changing the charge on said capacitor in accordance with the magnitude of the voltage across the armature of the motor during at least a portion of said other portion of at least some of those same half cycles, and means responsive to conductivity of said device for interrupting said circuit during said variable portions of said half cycles.

20. In an electrical circuit for controlling the flow of power from an alternating current source to a direct current motor having an armature, the combination of a controllable rectifier device connected in series between the motor and the source, control means for controlling said device to cause it to be conductive during controllably variable portions of half cycles of the source current thereby to vary the power input to the motor, a capacitor, circuit means for establishing a current-flow circuit for said capacitor including the armature for changing the charge on said capacitor in accordance with the magnitude of the voltage across the armature of the motor during at least a portion of at least some of those same half cycles, and means for interrupting said circuit during said variable portions of said half cycles comprising a unidirectional current conducting device connected to said rectifier device and controlled thereby, and means including said rectifier device and effective solely while said rectifier device is conductive for applying a voltage across said unidirectional current conducting device to cause it to prevent the flow of current in said circuit including the armature during said variable portions of said half cycles.

21. In an electrical circuit for controlling the flow of power from an alternating current source to a direct current motor having an armature, the combination of a controllable rectifier device connected in series between the motor and the source, control means for controlling said devices to cause it to be conductive during controllably variable portions of half cycles of the source current and to be nonconductive during the other portion thereof thereby to vary the power input to the motor, a capacitor, circuit means for establishing a current-flow circuit for said capacitor including the armature for changing the charge on said capacitor, voltage-polarity responsive unidirectional current conducting means for controlling the current flow in said circuit connected to said rectifier device, means for applying a voltage across said unidirectional current conducting means of a polarity to prevent conduction through said unidirectional current conducting means during said variable portions of said half cycles, and means for applying a voltage across said unidirectional current conducting means of a polarity to permit conduction therethrough during said at least a portion of at least some of those same half cycles.

22. In an electrical circuit for controlling the flow of power from an alternating current source to a direct current motor having an armature, the combination of a controllable rectifier device connected in series between the motor and the source, control means for controlling said device to cause it to be conductive during controllably variable portions of half cycles of the source current thereby to vary the power input to the motor, a capacitor, circuit means for establishing a current-flow circuit for said capacitor including the armature for changing the charge on said capacitor, voltage-polarity responsive unidirectional current conducting means for controlling the current flow in said circuit, means including said rectifier device and effective solely while said rectifier device is conductively for applying a voltage to said unidirectional current conducting means of a polarity to prevent conduction through said unidirectional current conducting means during said variable portions of said half cycles, and means including said armature for applying a voltage to said unidirectional current conducting means of a polarity to permit conduction therethrough during said at least a portion of at least some of those same half cycles.

23. In an electrical circuit for controlling the flow of power from an alternating current source to a direct current motor having an armature, the combination of a controllable rectifier device connected in series between the motor and the source, control means for controlling said device to cause it to be conductive during controllably variable portions of half cycles of the source current thereby to vary the power input to the motor, a capacitor, circuit means for establishing a charging circuit for said capacitor for charging said capacitor in accordance with the magnitude of the voltage across the armature of the motor during at least a portion of at least some of those same half cycles, and means for interrupting said charging circuit during said variable portions of said half cycles comprising voltage-polarity responsive unidirectional current conducting means, means for applying a voltage to said unidirectional current conducting means of a polarity to prevent conduction through said unidirectional current conducting means during said variable portions of said half cycles, and means for applying a voltage to said unidirectional current conducting means of a polarity to permit conduction therethrough during said at least a portion of at least some of those same half cycles.

24. In an electrical circuit for controlling the flow of power from an alternating current source to a direct current motor, the combination of a controllable rectifier device, a first unidirectional current conducting device, means for connecting said rectifier device said first unidirectional current conducting device and the motor in series with one another across the source, a capacitor, a second unidirectional current conducting device connected to said capacitor, means connecting said capacitor and said second unidirectional current conducting device across said first unidirectional current conducting device, a charging resistor for said capacitor connected between one terminal of said first unidirectional current conducting device and one terminal of the motor, and means controlled by said capacitor for controlling said rectifier device.

25. The combination of claim 24 in which said one terminal of said first unidirectional current conducting device is connected to said rectifier device, and in which the other terminal of the motor is connected to the other terminal of said first unidirectional current conducting device, and further including a discharging resistor for and connected across said capacitor.

References Cited by the Examiner
UNITED STATES PATENTS
2,325,092    7/1943    Andrews _____ 318—345 X ORIS L. RADER, *Primary Examiner.*

JOHN F. COUCH, *Examiner.*